US006226145B1

United States Patent
Genheimer et al.

(10) Patent No.: US 6,226,145 B1
(45) Date of Patent: May 1, 2001

(54) ACTUATOR ASSEMBLY MOUNTED DISC SNUBBER

(75) Inventors: Stephen R. Genheimer, Mustang; Kenneth L. Pottebaum, Yukon; Jon P. Baker; John D. Stricklin, both of Oklahoma City, all of OK (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/537,816

(22) Filed: Mar. 28, 2000

Related U.S. Application Data (60) Continuation of application No. 09/114,956, filed on Jul. 13, 1998, now Pat. No. 6,084,744, which is a division of application No. 08/659,338, filed on Jun. 6, 1996, now Pat. No. 5,801,899.
(60) Provisional application No. 60/004,924, filed on Oct. 6, 1995, and provisional application No. 60/009,172, filed on Dec. 22, 1995.

(51) Int. Cl.⁷ .............................. G11B 5/54; G11B 21/22
(52) U.S. Cl. .......................................................... 360/97.02
(58) Field of Search .............................. 360/97.01, 97.02, 360/265.7

(56) References Cited

U.S. PATENT DOCUMENTS

| | | |
|---|---|---|
| 3,713,121 | 1/1973 | Fasano et al. . |
| 4,491,888 | 1/1985 | Brown et al. . |
| 4,843,503 | 6/1989 | Hazebrouck et al. . |
| 5,140,478 | 8/1992 | Yoshida . |
| 5,189,577 | 2/1993 | Nishida et al. . |
| 5,214,549 | 5/1993 | Baker et al. . |
| 5,231,556 | 7/1993 | Blanks . |
| 5,235,482 | 8/1993 | Schmitz . |
| 5,404,636 | 4/1995 | Stefansky et al. . |
| 5,422,770 | 6/1995 | Alt . |
| 5,483,397 | 1/1996 | Gifford et al. . |
| 5,483,398 | 1/1996 | Boutaghou . |
| 5,666,239 | 9/1997 | Pottebaum . |
| 5,754,371 | 5/1998 | Meyer et al. . |
| 5,757,587 | 5/1998 | Berg et al. . |
| 5,831,793 | 11/1998 | Resh . |

FOREIGN PATENT DOCUMENTS

| | | |
|---|---|---|
| 4-079085 | 3/1992 | (JP) . |
| 4-188476 | 7/1992 | (JP) . |

*Primary Examiner*—William Klimowicz
(74) *Attorney, Agent, or Firm*—Crowe & Dunlevy (57) ABSTRACT

Apparatus for protecting a disc drive from damage due to non-operational mechanical shocks, the disc drive comprising a rotatable disc having an inner radius and an outer radius and a controllably rotatable actuator adjacent the disc. A snubber is provided adjacent the disc, the snubber having a body portion rigidly affixed with respect to the disc and snubber arms connected to the body portion. The snubber arms extend from the body portion towards the disc and above and below the elevation of the disc, with each snubber arm having a distal end located at a position adjacent the disc between the inner and the outer radii of the disc and towards the outer radius of the disc. The height of each snubber arm limits deflection of the disc at the outer radius of the disc as a result of mechanical shock forced supplied to the disc drive assembly.

1 Claim, 5 Drawing Sheets

ACTUATOR ASSEMBLY MOUNTED DISC SNUBBER

CROSS REFERENCE TO RELATED APPLICATIONS

This application claims priority to Provisional Application Ser. No. 60/004,924 filed Oct. 6, 1995, and Provisional Application Ser. No. 60/009,172 filed Dec. 22, 1995, hereby incorporated by reference, and is a continuation of U.S. patent application Ser. No. 09/114,956 filed Jul. 13, 1998, now U.S. Pat. No. 6,084,744, which is divisional of U.S. patent application Ser. No. 08/659,338 filed Jun. 6, 1996, now U.S. Pat. No. 5,801,899 .

BACKGROUND OF THE INVENTION

1. Field of the Invention

This invention relates generally to the field of disc drive data storage devices, and more particularly, but not by way of limitation, to a snubber for protecting a hard disc drive from damage due to non-operational, mechanical shocks.

2. Discussion

Disc drives are commonly used in workstations, personal computers, portables, and other computer systems to store large amounts of data in a form that can be made readily available to a user. In general, a disc drive comprises one or more magnetic discs that are rotated by a spindle motor at a constant high speed. The surface of each disc is divided into a series of data tracks which are spaced radially from one another across a band having an inner diameter and an outer diameter. The data tracks extends generally circumferentially around the discs and store data in the form of magnetic flux transitions within the radial extent of the tracks on the disc surfaces. Typically, each data track is divided into a number of data sectors that store fixed sized data blocks.

A head includes an interactive element such as a magnetic transducer which senses the magnetic transitions on a selected data track to read the data stored on the track, or to transmit an electrical signal that induces magnetic transitions on the selected data track to write data to the track. The head includes a read/write gap that positions the active elements of the head at a position suitable for interaction with the magnetic transitions on the data tracks of a disc as the disc rotates.

As is known in the art, each head is mounted to a rotary actuator arm and is selectively positionable by the actuator arm over a preselected data track of the disc to either read data from or write data to the preselected data track. The head includes a slider assembly having an air bearing surface that causes the head to fly over the data tracks of the disc surface due to fluid air currents caused by rotation of the disc.

Typically, several discs are stacked on top of each other and the surfaces of the stacked discs are accessed by the heads mounted on a complementary stack of actuator arms which comprise an actuator assembly, or "E-block". The E-block generally includes head wires which conduct electrical signals from the heads to a flex circuit, which in turn conducts the electrical signals to a flex circuit bracket mounted to a disc drive base deck. For a general discussion of E-block assembly techniques, see U.S. Pat. No. 5,404,636 entitled METHOD OF ASSEMBLING A DISK DRIVE ACTUATOR, issued Apr. 11, 1995 to Stefansky et al., assigned to the assignee of the present invention and incorporated herein by reference.

As will be recognized, a continuing trend in the industry is the reduction in size of modern disc drives. As a result, the discs in the disc stacks of modern disc drives are being brought closer together, providing narrower vertical gaps between adjacent discs. Although facilitating greater amounts of storage capacity, such narrow vertical spacing of the discs gives rise to a problem of increased sensitivity of the disc drives to non-operating, mechanical shocks; particularly, predominant failure modes in modern disc drives have been found to include damage to the surfaces of the discs and damage to the actuator arms as a result of mechanical shocks encountered during the shipping and handling of the drives.

Computer modeling of particular disc drives has revealed that one primary cause of interference between discs and actuator arms is the first mechanical bending mode of the discs, which has been found to cause over 50% of the motion between the arms and discs in selected disc drive designs. The bending mode is generally dependent upon the material, diameter and thickness of the discs, and these factors are not readily modified in a disc drive design.

Thus, there is a need for an improved approach to reducing the susceptibility of damage in disc drives as a result of non-operating, mechanical shocks.

SUMMARY OF THE INVENTION

The present invention provides an apparatus for protecting a disc drive from damage due to mechanical shocks encountered during shipment and handling.

The disc drive comprises a disc mounted for rotation at a constant speed about a vertical axis, the disc having an inner radius and an outer radius. A rotary actuator is mounted adjacent the disc, the is controllably rotatable with respect to the disc. A snubber is provided adjacent the disc, the snubber having a body portion rigidly affixed to resist movement in the direction of the vertical axis of the disc. Additionally, snubber arms are connected to and extend from the body portion.

The snubber arms extend from the body portion towards the disc and above and below the elevation of the disc, with each snubber arm having a distal end located at a position adjacent the disc between the inner and outer radii of the disc and towards the outer radius of the disc. The vertical height of each snubber arm limits vertical deflection of the disc at the outer radius of the disc as a result of mechanical shock forces supplied to the disc drive assembly.

An object of the present invention is to protect components of a disc drive, including discs and actuator assemblies, from damage due to non-operating, mechanical shocks encountered during shipping and handling of the drive.

Another object of the present invention is to limit the deflection of the disc of a disc drive as a result of a mechanical shock.

Still another object of the present invention is to provide protection from damage due to mechanical shocks in an easily implemented, cost effective manner.

Other objects, advantages and features of the present invention will be apparent from the following description when read in conjunction with the drawings and appended claims.

BRIEF DESCRIPTION OF THE DRAWINGS

FIG. 8 is an elevational view of an E-block having an over-molded snubber.

FIG. 10 is a cross-sectional, elevational view of a portion of an E-block and an associated pin snubber.

DETAILED DESCRIPTION OF THE PREFERRED EMBODIMENT

Figure 1:
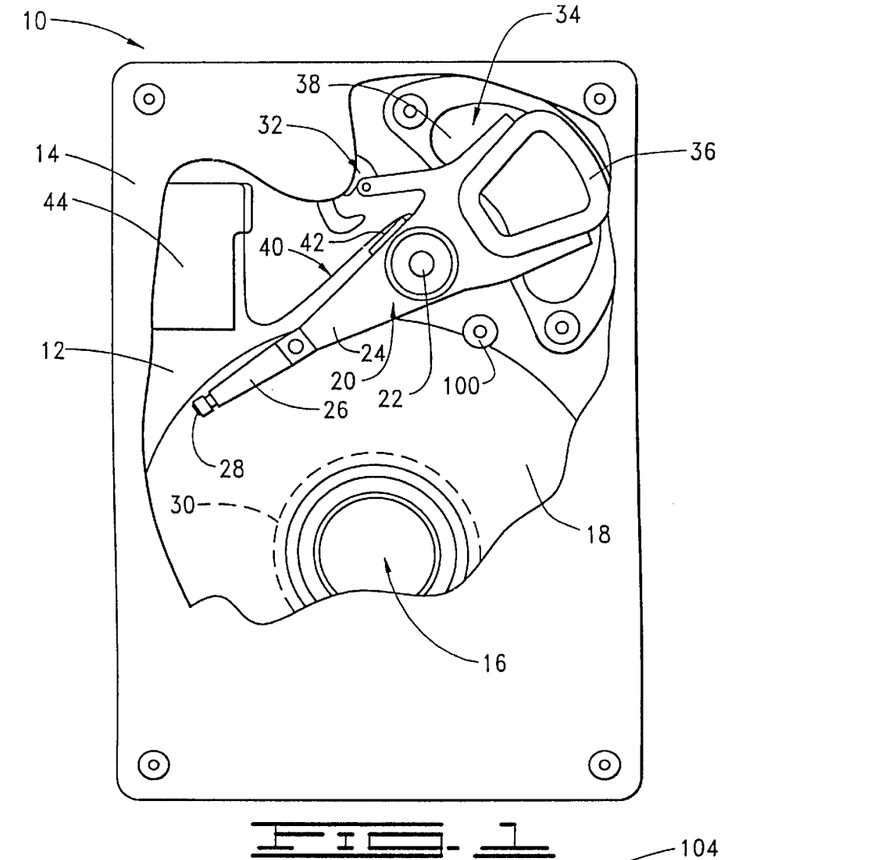
FIG. 1 is a top plan view of a disc drive in which the present invention is particularly useful.

Turning now to the drawings and more particularly to FIG. 1, shown therein is a top plan view of a disc drive 10 in which the present invention is particularly useful. The disc drive 10 includes a base deck 12 to which various disc drive components are mounted and a top cover 14, which provides a sealed internal environment for the disc drive 10. The top cover 14 is shown in a partial cut-away fashion to expose selected components of interest.

Mounted to the base deck 12 is a spindle motor (shown generally at 16) to which a plurality of discs 18 are mounted for rotation at a constant high speed. Adjacent the discs 18 is an actuator assembly 20 (hereinafter sometimes also referred to as an "E-block") which pivots about a pivot shaft 22 in a rotary fashion. The E-block 20 includes actuator arms 24 which support gimbal assemblies 26 (hereinafter also sometimes referred to as "load springs"). The load springs 26 in turn support heads 28, with each of the heads 28 corresponding to a surface of one of the discs 18. As provided hereinabove, the heads 28 are positionably located over data tracks (not shown) of the discs 18 in order to read data from and write data to the tracks, respectively. At such time that the disc drive 10 is not in use, the heads 28 are moved to landing zones (denoted at broken line 30), which are located in FIG. 1 near the inner diameter of the discs 18.

It will be recognized that the E-block 20 is provided with a latching arrangement (shown generally at 32) to secure the E-block 20 when the disc drive 10 is not in use. For a general discussion of typical E-block latching arrangements, see U.S. Pat. No. 5,231,556 entitled SELF-HOLDING LATCH ASSEMBLY, issued Jul. 27, 1993 to Blanks, assigned to the assignee of the present invention and incorporated herein by reference.

Continuing with FIG. 1, the E-block 20 is controllably positioned by way of a voice coil motor (VCM, shown generally at 34), comprising an actuator coil 36 immersed in the magnetic field generated by a permanent magnet 38. It will be recognized that a magnetically permeable flux path (such as a steel plate) is mounted above the actuator coil 36 to complete the magnetic circuit of the VCM 34, but for purposes of illustration this flux path has not been shown in FIG. 1. When controlled DC current is passed through the actuator coil 36, an electromagnetic field is set up which interacts with the magnetic circuit of the VCM 34 to cause the actuator coil 36 to move relative to the permanent magnet 38 in accordance with the well-known Lorentz relationship. As the actuator coil 36 moves, the E-block 20 pivots about the pivot shaft 22. causing the heads 28 to move across the surfaces of the discs 18.

To provide the requisite electrical conduction paths between the heads 28 and disc drive read/write circuitry (not shown), head wires (not separately shown) are routed on the E-block 20 from the heads 28, along the gimbal assemblies 26 and the actuator arms 24, to a flex circuit assembly 40. The head wires are secured (by way of a suitable soldering process) to corresponding pads (not separately designated in FIG. 1) of a printed circuit board (PCB) 42 of the flex circuit assembly 40. In turn, the flex circuit assembly 42 is connected to a flex circuit bracket (shown generally at 44) in a conventional manner. Preferably, the head wires are conductive wires having a relatively small diameter and are coated with a thin insulating layer (such as teflon). For purposes of clarity, this thin insulating layer is not separately designated in the drawings; however, it will recognized that this insulating layer is not present at the ends of the head wires where the head wires are soldered to the pads of the PCB 42. It will further be recognized that the actuator arms 24 and the gimbal assemblies 26 are provided with suitable wire guides (not separately shown) to capture and retain the head wires.

Additionally, FIG. 1 shows a snubber 100, which comprises a cylindrically-shaped assembly adjacent the stack of discs 18. As will be discussed in more detail below, the snubber 100 protects the disc drive 10 from damage as a result of mechanical shocks provided to the disc drive 10 without otherwise interfering with the normal operation of the drive. Particularly, the snubber 100 is provided with a configuration such that, when significant deflection of the discs 18 is induced by a mechanical shock incident, the discs 18 will contact the snubber 100 instead of the E-block 20, thus minimizing damage to the E-block 20 and the discs 18.

Figure 2:
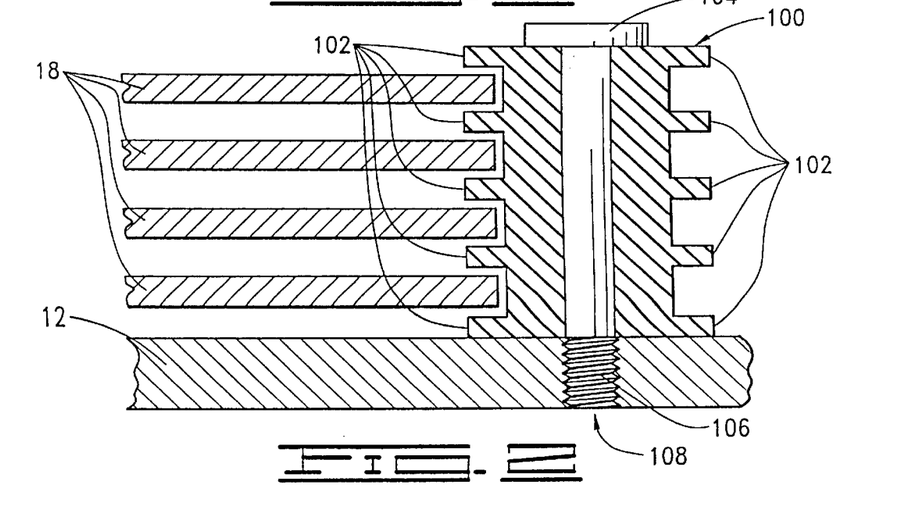
FIG. 2 is a cross-sectional, elevational view of the cylindrical-shaped snubber of FIG. 1.

Referring now to FIG. 2, shown therein is a cross-sectional, elevational view of the snubber 100, in conjunction with outlying portions of the discs 18 and the base deck 12 of FIG. 1. More particularly, FIG. 2 shows the snubber 100 to comprise a plurality of snubber arms 102 which extend radially away from the center of the snubber 100 and about the circumference of the snubber 100. The snubber 100 is secured to the base deck 12 by way of a suitable fastener 104, which as shown in FIG. 2 is provided with a threaded portion 106 which engages with a threaded hole 108 of the base deck 12.

The snubber arms 102 are configured to extend a nominal distance within the radial extent of the discs 18, as shown. Particularly, the snubber arms 102 are configured to extend sufficiently into the stack of discs 18 to constrain vertical deflection of the discs 18 as a result of mechanical shock However, the snubber arms 102 preferably do not extend to the recording surfaces (not shown) of the discs 18, as damage to the surfaces of the discs 18 may occur at locations where the discs 18 contact the snubber arms 102 during deflection of the discs 18. Thus, the distance the snubber arms 102 extend into the stack of discs 18 is an important consideration and will be dependent upon the design of a particular disc drive.

Additionally, the snubber arms 102 are vertically dimensioned to fit between the discs 18 as shown. It is expressly contemplated that the vertical dimensions of the snubber arms 102 will be less than the vertical dimensions of the gaps between adjacent discs 18, but will be greater than the vertical dimensions of the actuator arms 24 (of FIG. 1), to prevent contact between the discs 18 and the actuator arms 24 during deflection of the discs 18.

The snubber 100 is constructed from a suitable material which will provide the desired mechanical strength to constrain deflection of the discs 18, while at the same time will minimize the potential for damage to the snubber 100 and to the discs 18. Preferably, the snubber 100 is constructed from a plastic, non-marring material, such as polycarbonate or acetal. As shown in FIG. 1, the snubber 100 is preferably mounted near the E-block 20, in order to maximize protection of the actuator arms 24 and the discs 18. It will be recognized, however, that the snubber 100 can be located at positions other than adjacent to the E-block 20, as desired, further, the use of multiple snubbers 100 at various positions about the circumference of the discs 18 could be found to be advantageous in particular disc drive designs. Additionally, it is contemplated that the snubber arms 102 could extend only about a portion of the circumference of the snubber 100, the portion being adjacent the discs 18.

Figure 3:
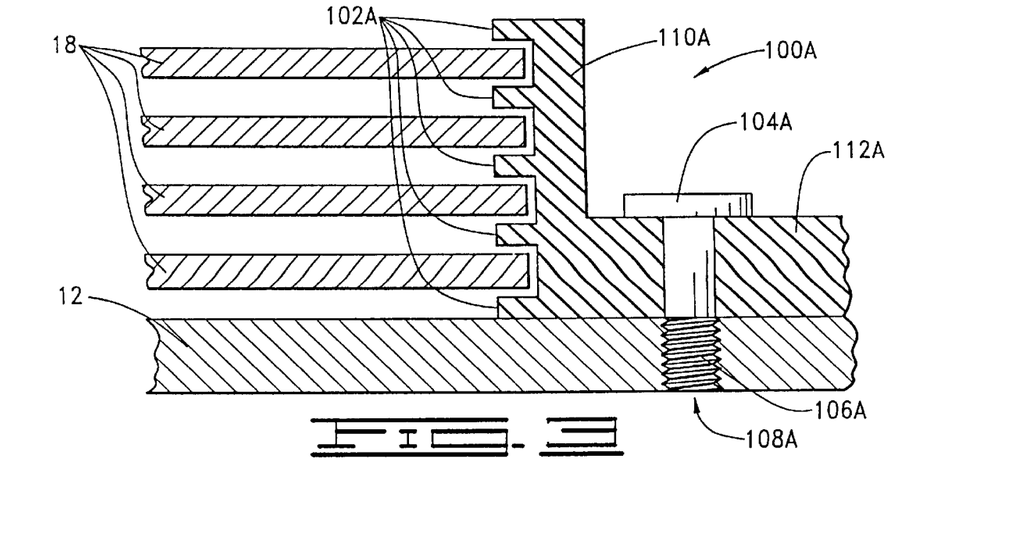
FIG. 3 is a cross-sectional, elevational view of an L-shaped snubber.

Referring now to FIG 3, shown therein is a cross-sectional, elevational view of a generally L-shaped snubber (designated as 100A) having a configuration similar to that of the cylindrical snubber 100 of FIGS. 1 and 2. As with the snubber 100, the snubber 100A of FIG. 3 includes snubber arms 102A which extend radially between adjacent discs 18. Additionally, the snubber 100A is secured to the base deck 12 with a suitable fastener 104A by way of a threaded portion 106A and a corresponding threaded hole 108A in the base deck 12. However, the snubber 100A has an L-shaped, cross-sectional configuration, as shown, including a vertical portion 110A and a horizontal portion 112A, which are configured as desired to provide the necessary strength for the snubber 100A, as well as to conform to internal space requirements of the disc drive 10. It will be recognized that the snubber 100A of FIG. 3 will generally require less space and comprise less material than the snubber 100, which may be important considerations in small form factor or low cost drive designs.

Figure 4:
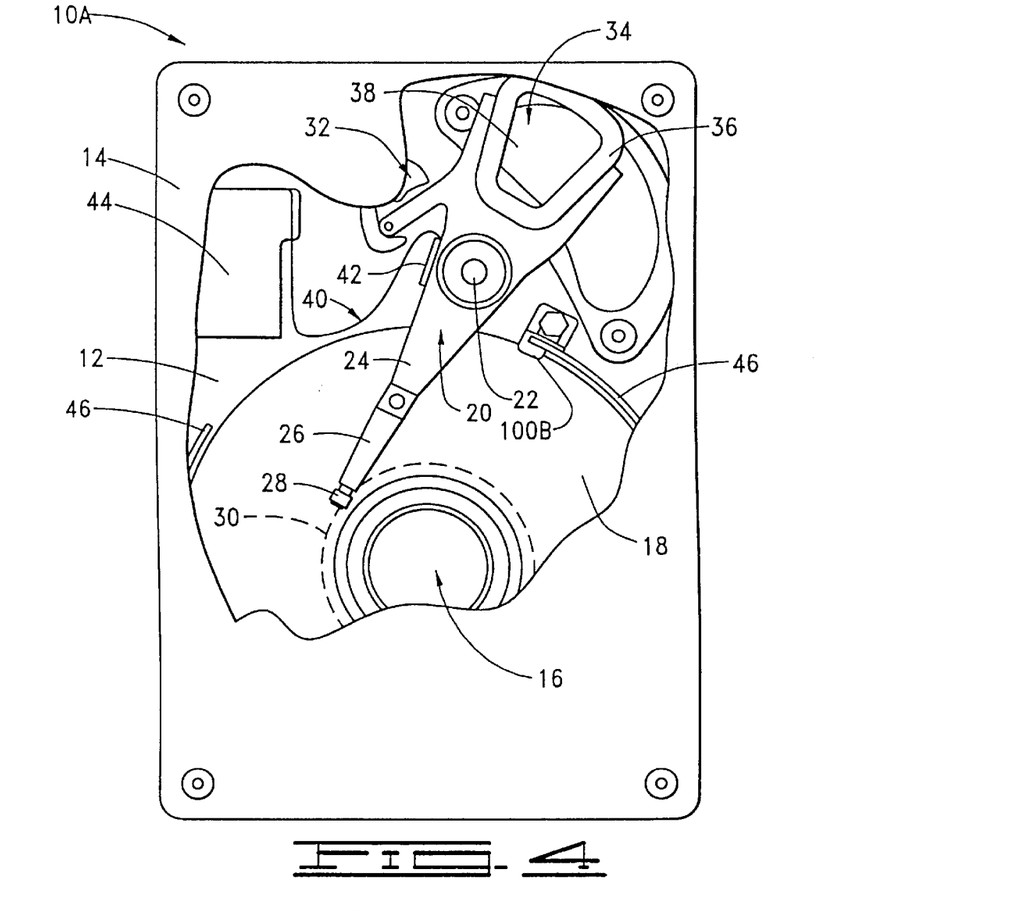
FIG. 4 is a top plan view of a disc drive having a shroud-mounted snubber.

Referring now to FIG. 4, shown therein is a disc drive 10A, which has a configuration similar to the disc drive 10 of FIG. 1 (for purposes of clarity, the same reference numbers for components shown in FIG. 1 have been used in FIG. 4). However, the disc drive 10A includes a disc shroud 46, which comprises a vertically extending flange adjacent the discs 18. As will be recognized, the disc shroud 46 is typically used to reduce wind resistance from the spinning discs 18 in order to reduce power requirements of the disc drive 10A, an important consideration in low power disc drive applications. Typically, the disc shroud 46 is formed as part of the base deck 12 and extends upwardly therefrom.

Additionally, FIG. 4 shows a snubber (designated as 100B) which is mounted to the disc shroud 46 and to the base deck 12. It will be recognized that the E-block 20 shown in FIG. 4 is at a different rotational position than the E-block 20 shown in FIG. 1 to more fully illustrate the snubber 100B; however, it will be recognized that a portion of the snubber 100B will extend under the E-block 20 when the E-block 20 is positioned as shown in FIG. 1. As with the snubbers 100, 100A discussed hereinabove, the snubber 100B serves to protect the disc drive 10 from damage due to deflection of the discs 18 as a result of mechanical shock.

Figure 5:
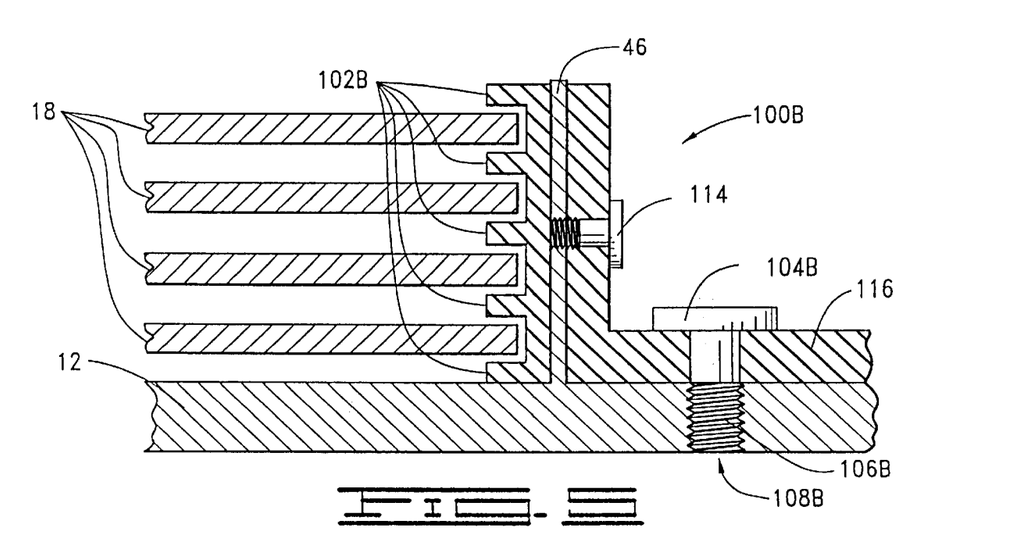
FIG. 5 is a cross-sectional, elevational view of the shroud-mounted snubber of FIG. 4.

The snubber 100B is shown in greater detail in FIG. 5, which provides a cross-sectional, elevational view of the snubber 100B in conjunction with the disc shroud 46, the discs 18 and the base deck 12. Particularly, FIG. 5 shows the snubber 100B to include snubber arms 102B, which extend radially between adjacent discs 18, in a manner similar to that described hereinabove. As shown in FIGS. 4 and 5, the snubber 100B is provided with a vertically oriented,. C-shaped configuration so that the snubber 100B wraps around the end of the disc shroud 46, as shown, and is secured to the disc shroud 46 by way of a suitable threaded fastener 114. Additionally, the snubber 100B is secured to the base deck 12 by way of a suitable base deck fastener 104B (by way of threads 106B which engage with a threaded hole 108B in the base deck 12). Thus, the fasteners 104B and 114 secure the snubber 100B relative to the base deck 12 and the disc shroud 46. The vertical height of the fastener 104B and a horizontal portion 116 of the snubber 100B are provided such that mechanical clearance exists between the fastener 104B and the horizontal portion 116 and the E-block 20 (as shown in FIG. 4).

Figure 6:
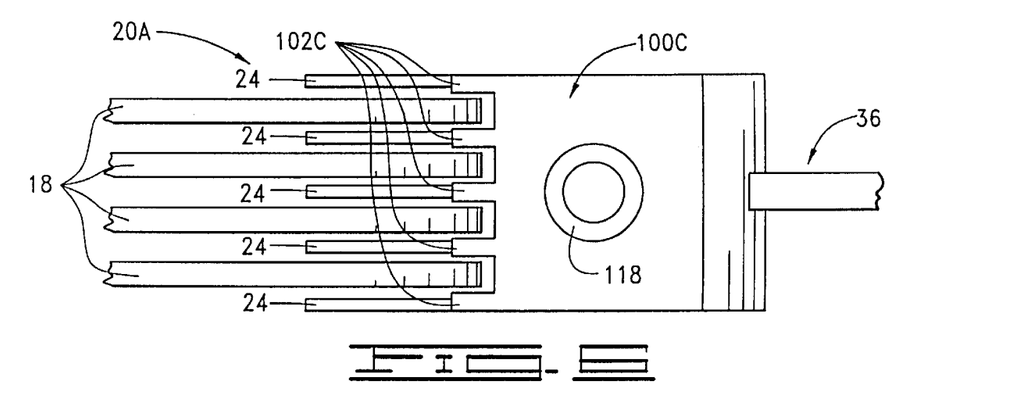
FIG. 6 is an elevational view of a snubber mounted to an E-block.

Referring now to FIG. 6, shown therein is an elevational view of an E-block 20A, which is generally similar to the E-block 20 discussed hereinabove, except to the extent that the E-block 20A includes an E-block mounted snubber 100C mounted to the "up-wind" side of the E-block 20. The E-block 20A is shown in conjunction with the discs 18, including the extension of the actuator arms 24 between adjacent discs 18. For purposes of clarity, the load springs 26 and heads 28 have not been shown in FIG. 6, but it will be understood that these elements extend radially from the actuator arms 24; particularly, it will be readily understood by those skilled in the art that the top and bottom actuator arms 24 have one load spring 26 and head 28 extending therefrom, respectively, and the rest of the actuator arms 24 have two load springs 26 and heads 28 extending therefrom, respectively.

The snubber 100C is shown mounted to the side of the E-block 20A, with snubber arms 102C extending adjacent to the corresponding actuator arms 24 between adjacent discs 18. The snubber arms 102C operate in a manner as described hereinabove to protect the actuator arms 24 from damage as a result of deflection of the discs 18, by limiting the vertical extent of travel of the outer diameters of the discs 18. It will be understood that the snubber 100C is mounted to the side of the E-block 20A by way of a suitable fastener 118, which preferably inserts through a hole (not shown) in the snubber 100C and engages with a corresponding threaded hole (also not shown) in the E-bock 20A. It will be recognized by those skilled in the art that in actuator designs that use a screw to secure the bearing cartridge (not separately designated, but surrounding the pivot shaft 22), this screw can also serve as the fastener 118 shown in FIG. 6 to secure the snubber 100C to the E-block. 20A.

An important advantage of the snubber 100C is that the protection provided by the snubber arms 102C is generally maximized by the adjacent placement of the snubber arms 102C to the actuator arms 24. Although not shown in the drawings, it will be recognized that the configuration of the snubber arms 102C can be modified as desired to account for the rotary movement of the E-block 20A relative to the discs 18 to minimize the radial extent of the snubber arms 102C into the stack of discs 18 over the range of movement of the E-block 20A.

Figure 7:
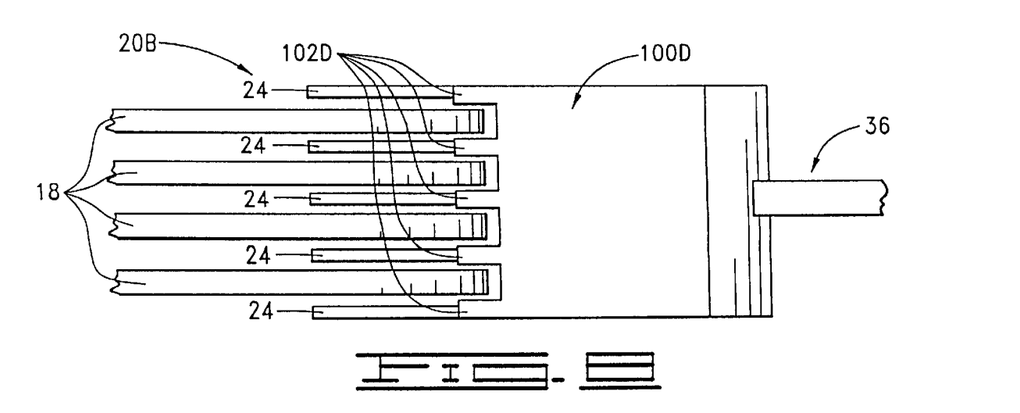
FIG. 7 is a top plan view of the E-block and snubber of FIG. 6.

Referring now to FIG. 7, shown therein, is a top plan view of the E-block 20A and snubber 100C of FIG. 6. For reference, FIG. 7 shows the E-block 20A to be pivotable about the pivot shaft 22, as provided above; additionally, the latching arrangement 32 and the flex circuit assembly 40 of FIGS. 1 and 4 are also shown in FIG. 7, for purposes of clarity.

As shown in FIG. 7, the snubber 100C of FIG. 6 is mounted to the side of the E-block 20A by way the fastener 118. Further, the snubber arms 102C extend as shown along the actuator arms 24.

Referring now to FIG. 8, shown therein is an elevational view of an E-block 20B, similar in configuration and operation to the E-blocks 20 and 20A discussed hereinabove. The E-block 20B is also shown in conjunction with the discs 18 and includes the actuator arms 24 extending radially between the discs 18, in a manner similar to the E-block 20A of FIG. 6.

However, the E-block: 20B of FIG. 8 includes the use of an over-molded snubber 100D, formed using a suitable over-molding process wherein an assembled stack of actuator arms 24 is selectively coated with a layer of material, such as plastic. Particularly, it is contemplated that the E-block 20B of FIG. 7 is subjected to such a process in order to form the over-molded snubber 100D thereon. Particularly, the snubber 100D is similar in configuration to the snubber 100C of FIG. 6, so that snubber arms 102D extend radially between the discs 18 and adjacent to the actuator arms 24; however, instead of providing the snubber arms 102D just adjacent the sides of the actuator arms 24, the over-molded snubber 100D of FIG. 8 includes material along the top and bottom surfaces of the actuator arms 24 as well. Additionally, the over-molding process allows the material comprising the snubber arms 102D to be "curved" with respect to the actuator arms 24, in order to maintain minimum extension of the snubber arms 102D into the stack of discs 18 as the E-block 20B rotates with respect to the discs 18.

Figure 9:
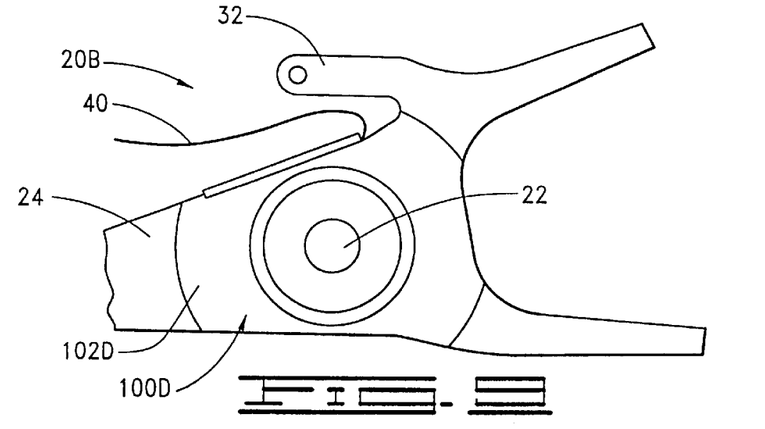
FIG. 9 is a top plan view of the E-block and snubber of FIG. 8.

The curved characteristic of the snubber arms 102D is more fully illustrated in FIG. 9, which shows a top plan view of the E-block 20B of FIG. 8. It will be recognized that the curved characteristic of the snubber arms 102D of FIG. 9 facilitates nominally constant extension of the snubber arms 102D into the stack of discs 18, irrespective of the rotary position of the E-block 20B. Further, it will be recognized that, depending upon the rotary position of the E-block 20B with respect to the discs 18 (not shown in FIG. 9), different portions of the snubber arms 102D will extend into the stack of discs 18. Of course, the curved characteristic of the snubber arms 102D can be selected as desired, depending upon the design of a particular drive, including the relative position of the pivot shaft 22 with respect to the discs 18 (and the resulting range of motion of the E-block 20B and the discs 18).

Referring now to FIG. 10, shown therein is a cross-sectional elevational view of a portion of an E-block 20C, which is generally similar to the E-blocks (20, 20A and 20B) described hereinabove, but includes a pin snubber 100E, comprising a plurality of pins 122 extending through each of a plurality of corresponding actuator arms 24A. The actuator arms 24A are generally similar in all respects to the actuator arms 24 described hereinabove, except that the actuator arms 24A are additionally provided with holes 124, through which the pins 122 are inserted during fabrication of the E-block 20C. As shown in FIG. 10, the pins 122 are sized and located accordingly with respect to the outer extreme of the discs 18, so that the pins 122 operate in a fashion as generally described above to limit deflection of the discs 18 as a result of mechanical shocks to the assembly shown therein. The pins 122 are selected from a suitable material that will maximize protection to the E-block 20C and at the same time minimize damage to the discs 18 in the event of a mechanical shock sufficient to bring the outer extremes of the discs 18 in contact with the pins 122. In one preferred method of fabrication, the holes 124 are drilled through the actuator arms 24A during a single operation, a single pin (not shown) is pressed through all of the holes 124 and the single pin is subsequently machined into the pins 122 configured as shown in FIG. 10.

Figure 11:
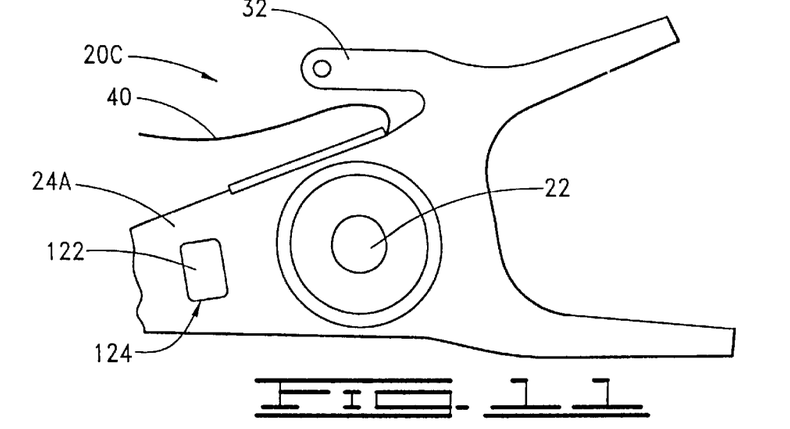
FIG. 11 is a top plan view of the E-block and pin snubber of FIG. 10.

A top plan view of the E-block 20C of FIG. 10 is shown in FIG. 11, illustrating the relative placement of the pins 122 and the actuator arms 24A. Although the pins 122 have been shown in FIG. 11 to have generally circular shapes, other shapes may be selected as desired, including shapes having a curved characteristic similar to the snubber arms 102D of FIG. 9 to maintain the radial extent of the pins 122 into the stack of discs 18 (not shown in FIG. 11).

Figure 12:
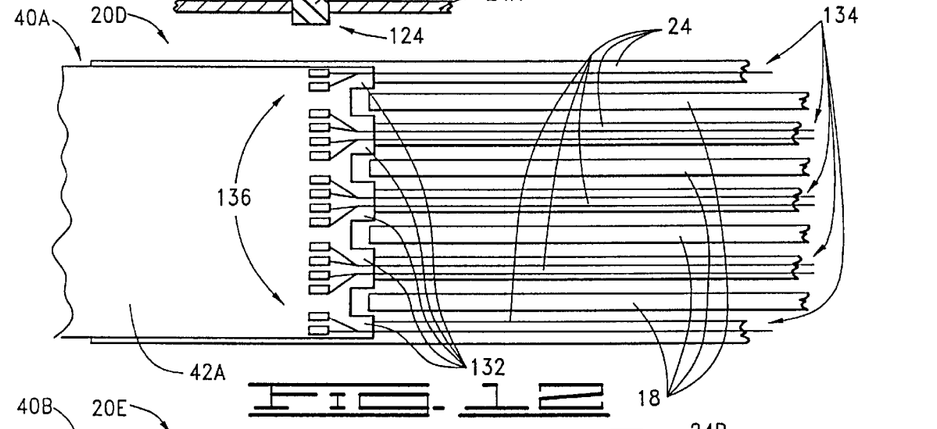
FIG. 12 is an elevational view of a portion of an E-block with a flex circuit assembly having flex extensions which serve as a disc snubber.

Referring now to FIG. 12, shown therein is an elevational view of a portion of an E-block 20D adjacent the stack of discs 18, the E-block 20D including a flex circuit assembly 40A which is generally similar to the flex circuit assembly 40 described hereinabove, with the addition of flex extensions 132 which extend from the flex circuit assembly 40 into the stack of discs 18. More particularly, the flex extensions 132 extend from a PCB 42A of the flex circuit assembly 40A, as shown.

As described hereinabove, electrical signals are transmitted by way of head wires (designated collectively as 134 in FIG. 12) which are routed from the heads 28 (not shown in FIG. 12) and along the actuator arms 24 to the PCB 42A. The distal ends of the head wires 134 are soldered to corresponding pads (collectively "136") on the PCB 42A as shown. The PCB 42A is rigidly mounted to the side of the E-block 20D. The flex extensions 132 extend radially between the discs 18, and are sufficiently rigid to limit deflection of the discs 18, in a manner similar to that described hereinabove. It will be recognized that the advantages associated with the flex circuit assembly 40A of FIG. 12 include the benefit that the snubber features of the flex circuit assembly 40A can be readily incorporated into the design of the flex circuit assembly 40A. Thus, the flex circuit assembly 40A can be implemented into existing drive designs without the need for E-block modifications or additional assembly steps.

Figure 13:
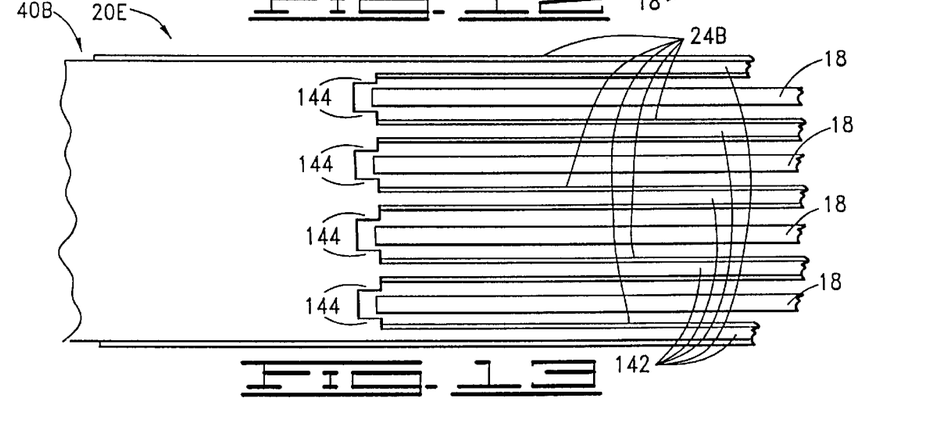
FIG. 13 is an elevational view of a portion of an E-block with a flex circuit assembly having flex strips adjacent actuator arms and tabs which serve as a disc snubber.

Referring now to FIG. 13, shown therein is an elevational view of a portion of an E-block 20E having a flex circuit assembly 40B, which is similar to the flex circuit assembly 40A of FIG. 12, with the exception that the flex circuit assembly 40B includes flex strips 142 which extend along corresponding actuator arms 24B.

The flex strips 142 accommodate connection paths (not shown) from the flex circuit assembly 40B to the heads 28 (not shown in FIG. 13) and serve as alternatives to the head wires 134 of FIG. 12. It will be recognized that the actuator arms 24B include conventional features (not particularly shown) to accommodate the flex strips 142 and such features are generally different from features used to capture and retain the head wires 134 (shown in FIG. 12).

The flex strips 142 of FIG. 13 include tabs 144, which are located near the outer extent of the discs 18. The tabs 144 extend vertically from the flex strips 142 and are configured to limit the deflection of the disc 18, in the manner described hereinabove. As with the flex circuit assembly 40A of FIG.

12, the flex circuit assembly 40B of FIG. 13 can be readily incorporated into existing drive designs that use conventional flex strips instead of wires.

It will be clear that the present invention is well adapted to carry out the objects and attain the ends and advantages mentioned as well as those inherent therein.

While presently preferred embodiments have been described for purposes of this disclosure, numerous changes may be made which will readily suggest themselves to those skilled in the art and which are encompassed in the spirit of the invention disclosed and as defined in the appended claims.

What is claimed is:

1. A disc drive comprising:

a rotatable disc;

a pivotal actuator supporting a read/write head in a data reading and writing relationship with the disc; and limit means supported by the actuator for limiting a range of deflection of the disc in response to application of a non-operational shock to the disc drive to prevent corresponding deflection of the actuator.

* * * * *